UNITED STATES PATENT OFFICE.

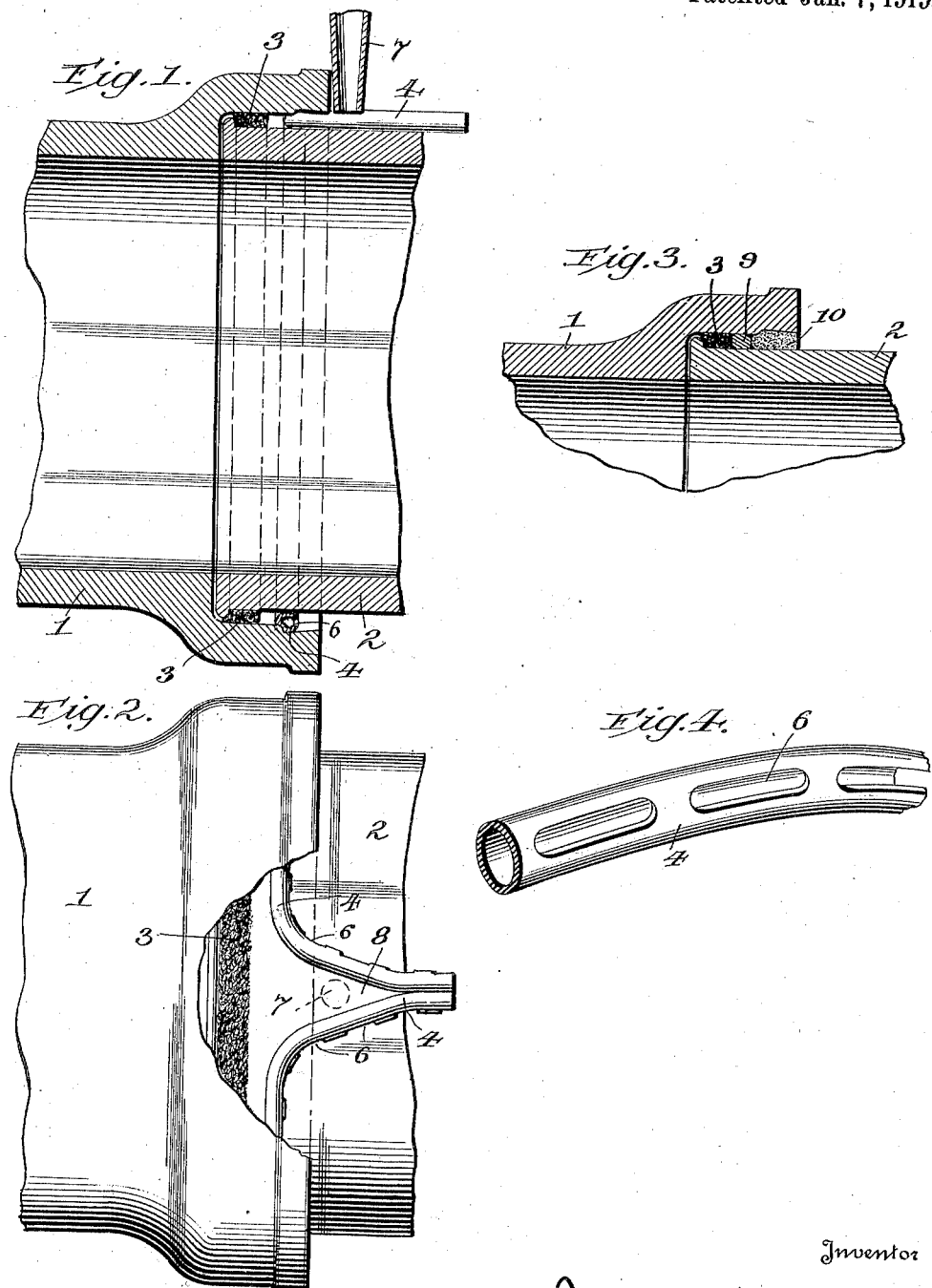

ROBERT B. HOWELL, OF OMAHA, NEBRASKA.

PIPE-JOINT AND METHOD OF PRODUCING SAME.

1,290,205.　　　　　Specification of Letters Patent.　　Patented Jan. 7, 1919.

Application filed May 25, 1918. Serial No. 236,515.

*To all whom it may concern:*

Be it known that I, ROBERT B. HOWELL, a citizen of the United States, residing at Omaha, in the county of Douglas and State of Nebraska, have invented certain new and useful Improvements in Pipe-Joints and Methods of Producing Same, of which the following is a specification.

My present invention pertains to an improved pipe joint and to the method of producing the same.

The method now commonly employed for joining bell and spigot cast iron water pipes is to insert the spigot of one pipe into the bell of another, leaving a uniform space around and between the parts and filling the space with molten lead, the lead afterward being driven more tightly into the bell by the known process of calking. As the junction of the spigot with the inside base of the bell of the following pipe is not necessarily tight, to prevent molten lead, when poured into the bell, from filtering through into the pipe, strands of jute yarn are first inserted and driven into the bell, thus producing, in effect, a dam. Jute yarn is commonly known or termed as a packing and the lead as a filler. The calking is necessary in order to drive or wedge the lead into the bell to produce a joint which will not leak. Fillers other than lead have been devised which do not depend upon calking for tightness but on their tendency to adhere to the metal. However, in the case of such fillers there is a lack of uniformity in adhesion and, as a consequence, seepage or leaks will occur, under high pressure, at various points about such a joint, the water working its way between the filler and the metal of the bell or spigot, as the case may be.

The present invention has for its main object the production of a joint in which relatively cheap materials may be employed to produce a water-tight joint and one which does not require any calking and which may be used upon both small and large pipes and applied with facility. Stated in broad language, the joint may be said to comprise a body which under the action of the water flowing through the main or pipe will tend to disintegrate or silt and be carried into the outermost layer or constituent member of the joint which is preferably formed of a particular material hereinafter referred to. In other words, I have produced a joint which through the automatic silting of one portion of the joint will close up all leaks which may exist in the outermost portion of the joint. Moreover the joint requires no calking.

In the annexed drawings I have sought to illustrate the manner in which this joint is formed, wherein,—

Figure 1 is a longitudinal sectional view of the spigot and bell end of adjacent pipes showing the initial packing in place together with the dam or filler which is employed to assist in the pouring and placement of the silting material;

Fig. 2 a top plan view, partly broken away, showing the same relation of parts;

Fig. 3 a detail sectional view on an enlarged scale, of the complete joint; and

Fig. 4 a perspective view of a portion of the flexible tube employed to form the dam.

In said figures 1 denotes the bell end of the pipe and 2 the spigot end of the adjacent pipe or main section. The parts when assembled will have placed between them a packing or filler of jute, as indicated at 3. After this is positioned the rubber tube, indicated by 4, will be forced into the mouth of the bell and the ends of the tube will be carried outwardly, as indicated in Figs. 1 and 2, at the outermost portion of the pipe or main. As will be best noted upon reference to Fig. 4, the tube is provided with a series of longitudinal slots or openings 6 formed therein along one side, which slots allow the tube to collapse more readily and insures its proper placement within the bell of the pipe. Moreover such slots or openings facilitate the insertion of a tool therethrough in order that the inner portion of the tube may be more readily forced to place and thus insure its proper positioning within the bell. A tool with a shoulder portion, which shoulder is adapted to contact the mouth of the bell insures the proper placement of the tube within the bell. In other words, the shoulder on the tool forms a stop to limit the inward movement of the tool and the tube.

After the tube is thus positioned a gate, as 7, such as commonly employed in the pouring of lead joints, is provided at the upper divergent ends of the tube, such gate opening into the space indicated by 8 (Fig. 2) left between the inclined or divergent sections of the tube. I then pour into the space left between the dam formed by the tube and the outermost face of the packing 3, a suitable material which will silt under the action of the water which passes through the jute or packing 3, when the water is turned into the main. Such material will preferably be composed of clay or pulverized unslaked lime, preferably the former, flowers of sulfur and sand, so proportioned and intimately mixed that when subjected to heat and melted it will pour like metal. The material, indicated by 9, (Fig. 3) readily sets and when so set the tube 4 will be pulled out of place leaving a space in the outermost end of the bell. There will, of course, be formed a gate button and this button is knocked off and the adjacent silting material or filler 9 will be chiseled out at this point so as to make it of substantially the same thickness as the cast in portion which extends around the bell. An ordinary runner is then placed about the spigot end 2 adjacent the bell and the final filling, indicated by 10, is poured. This material is preferably a composition having sulfur as its base and inter-mixed therewith will be sand and carbonaceous material, such, for instance, as finely ground coke or graphite, the parts being substantially the proportions of 46 of sulfur, 46 of sand and 8 of the remaining material. This material will be melted and when so melted will be poured producing the outermost member 10 of the joint. This composition forming the member 10 will not materially shrink when it cools. The fact that it may be melted at a low temperature facilitates its use and ready application and does away with checking or cracking to a high degree. When water is turned into the main or pipe jointed in the manner above specified, it will, of course, seep through the jute 3 strike the silting material 9 and cause its disintegration. Such material will then pass into and close any cracks or crevices which may exist in the outer filler 10.

In practice it has been found that the joint and method of producing the same have given highly satisfactory results under severe service conditions. I have successfully applied the joints to mains as large at 48" in diameter and subject to high pressure. When the joint is employed upon small pipes, say under 24" in diameter, the silting element may be omitted and the silt contained within the water flowing through the pipe depended upon to fill the cracks or crevices in the outer member 10. Where, however, as with large mains or pipes, the initial leaking may prove a nuisance, the placing of the silting material 9 in position between the jute and the outermost composition 10 will take up such leakage very readily and effectually stop the same.

By employing a tapered plug to form the gate a gate of proper size will always be produced. That is to say, the gate will have proper cross section and will be of proper height to produce the necessary head to facilitate the pouring of the filling or closure. This becomes essential owing to the nature of the material employed, which, as will be appreciated, will cool rapidly and tend to clog the gate if it be too small, and, furthermore, would prevent the material from running around the entire extent of the joint unless a proper head is had.

No claim is herein made to the specific composition forming the element 10 as above set forth as that forms the basis of my application filed on or about May 19th, 1917, Serial No. 169,759.

Having described my invention, what I claim as new and desire to secure by Letters Patent is,—

1. That method of forming joints between contiguous pipe sections which consists in placing a silting material between adjacent faces of said sections and thereafter placing a filling or closure between such faces at the outermost portion of the joint.

2. That method of forming water-tight joints between contiguous pipe sections which consists in casting a material susceptible of disintegration through the action of water between adjacent faces of said sections and thereafter casting a filling or closure which is unaffected by water between said faces at the outermost portion of the joint.

3. That method of forming a water-tight union between a bell and spigot pipe joint which consists in placing a jute filling in the base of the bell and around the spigot end, then casting a band or ring of material adjacent said filling, said material being susceptible of disintegration under the action of water, and finally casting a filling or closure in the mouth or outer end of the bell, said closure being hard when set and unaffected by water.

4. In combination with a bell and spigot of contiguous pipe sections; a silting material surrounding the inner end of the spigot; and a closure placed in the outer end of the bell, said material being hard and unaffected by water.

5. In combination with a bell and spigot of contiguous pipe sections; a seal therefor, said seal comprising a material cast in place and which is disintegrated by the action of water; and a closure for the outer end of the bell, said closure being cast in place and being hard and unaffected by water.

6. In combination with a bell and spigot of contiguous pipe sections; a seal therefor, said seal comprising a ring-shaped body cast in place and containing sand, sulfur and a substance which disintegrates under the action of water; and a closure for the outer end of the bell, said closure being cast in place and containing sulfur, sand, and a carbonaceous material.

7. That method of forming joints between contiguous pipe sections which consists in placing a silting material between adjacent faces of said sections and thereafter casting a non-metallic filling or closure between such faces at the outermost portion of the joint.

8. That method of forming joints between contiguous pipe sections which consists in placing a silting material between adjacent faces of said sections and thereafter casting a non-metallic filling or closure between such faces at the outermost portion of the joint, such filling having sulfur as a base.

In testimony whereof I have signed my name to this specification.

ROBERT B. HOWELL.